US012566017B2

(12) United States Patent
Schindler et al.

(10) Patent No.: US 12,566,017 B2
(45) Date of Patent: Mar. 3, 2026

(54) SYSTEMS AND METHODS FOR CONTROLLING EQUIPMENT BASED ON CHILLER EFFICIENCY ASSESSMENTS

(71) Applicant: Honeywell International Inc., Charlotte, NC (US)

(72) Inventors: Zdenek Schindler, Prague (CZ); Jiri Rojicek, Prague (CZ); Jakub Malanik, Prague (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 136 days.

(21) Appl. No.: 18/297,240

(22) Filed: Apr. 7, 2023

(65) Prior Publication Data

US 2024/0337421 A1    Oct. 10, 2024

(51) Int. Cl.
*G06N 20/00*       (2019.01)
*F25B 49/02*       (2006.01)

(52) U.S. Cl.
CPC ............. *F25B 49/02* (2013.01); *G06N 20/00* (2019.01)

(58) Field of Classification Search
CPC .. F24F 11/62; F24F 11/46; F24F 11/30; F24F 2140/00; F25B 2700/00; F25B 2500/19; F25B 2400/06; F25B 49/00
See application file for complete search history.

(56) References Cited

U.S. PATENT DOCUMENTS

2014/0229146 A1 * 8/2014 Gonzalez ................ F24F 11/46
703/2

OTHER PUBLICATIONS

Alonso et al., "Estimating cooling production and monitoring efficiency in chillers using a soft sensor," Neural Computing and Applications, 32:17291-17308, (2020).
European search report Mailed on Aug. 5, 2024 for EP Application No. 24164120, 10 page(s).
Ho et al., "Chiller system optimization using k nearest neighbour regression," Journal of Cleaner Production, 303:1-15, (Apr. 10, 2021).
Lu et al., "Using cooling load forecast as the optimal operation scheme for a large multi-chiller system," International Journal of Refrigeration, 34(8):2050-2062, (May 19, 2011).
Shan et al., "Development and validation of an effective and robust chiller sequence control strategy using data-driven models," Automation in Construction, 65:78-85, (Feb. 9, 2016).
Communication about intention to grant a European patent Mailed on Oct. 20, 2025 for EP Application No. 24164120, 6 page(s).

* cited by examiner

*Primary Examiner* — Ana M Vazquez
(74) *Attorney, Agent, or Firm* — ALSTON & BIRD LLP

(57) ABSTRACT

A method for assessing an efficiency of a chiller. The method includes: performing, using a processor of a computer system, an energy balance check on operational data of a chiller in a chiller group; selecting, using the processor and based on the energy balance check, a reference chiller from one or more other chillers in the chiller group, wherein an energy flow of the reference chiller has a best energy balance amongst the one or more other chillers; determining, using the processor and reference operational data from the reference chiller, the efficiency of the chiller; and performing, based on the determined efficiency of the chiller, an action with respect to a chiller plant containing the chiller. Other aspects are described and claimed.

20 Claims, 9 Drawing Sheets

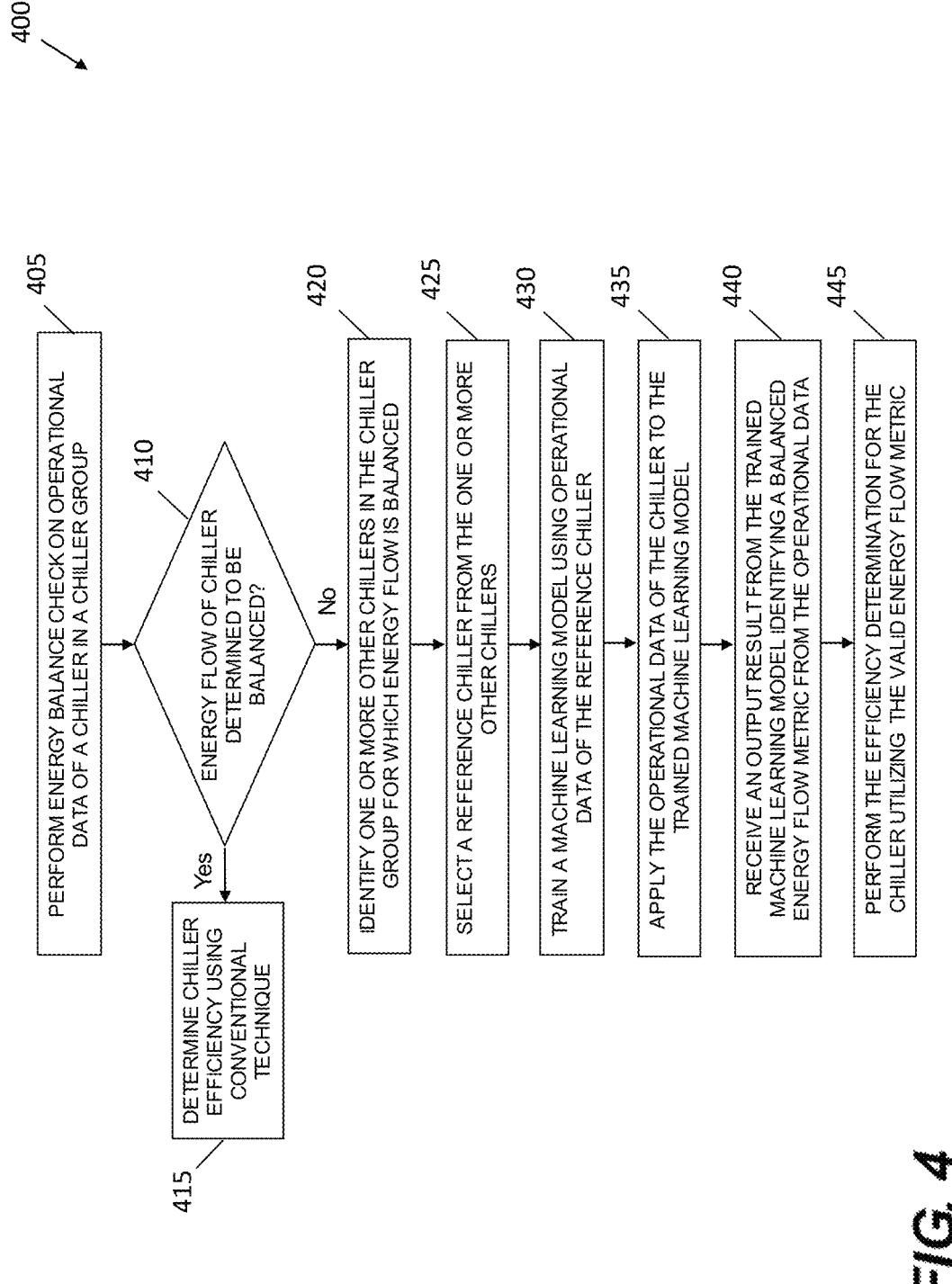

400

405 PERFORM ENERGY BALANCE CHECK ON OPERATIONAL DATA OF A CHILLER IN A CHILLER GROUP

410 ENERGY FLOW OF CHILLER DETERMINED TO BE BALANCED?

Yes

415 DETERMINE CHILLER EFFICIENCY USING CONVENTIONAL TECHNIQUE

No

420 IDENTIFY ONE OR MORE OTHER CHILLERS IN THE CHILLER GROUP FOR WHICH ENERGY FLOW IS BALANCED

425 SELECT A REFERENCE CHILLER FROM THE ONE OR MORE OTHER CHILLERS

430 TRAIN A MACHINE LEARNING MODEL USING OPERATIONAL DATA OF THE REFERENCE CHILLER

435 APPLY THE OPERATIONAL DATA OF THE CHILLER TO THE TRAINED MACHINE LEARNING MODEL

440 RECEIVE AN OUTPUT RESULT FROM THE TRAINED MACHINE LEARNING MODEL IDENTIFYING A BALANCED ENERGY FLOW METRIC FROM THE OPERATIONAL DATA

445 PERFORM THE EFFICIENCY DETERMINATION FOR THE CHILLER UTILIZING THE VALID ENERGY FLOW METRIC

FIG. 4

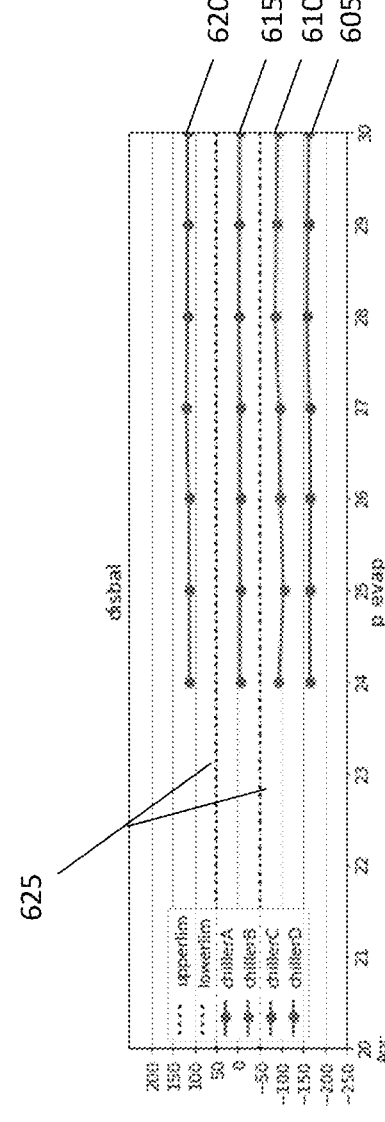
*FIG. 6*

800

COP determined by conventional method

COP determined by inventive method – from the condenser heat flow

805

810

815

820

SYSTEMS AND METHODS FOR CONTROLLING EQUIPMENT BASED ON CHILLER EFFICIENCY ASSESSMENTS

TECHNICAL FIELD

Various embodiments of the present disclosure relate generally to controlling equipment, such as chillers, based on assessing efficiency of a chiller in a chiller group, and, more particularly, to controlling chillers by determining data points to utilize in a coefficient of performance (COP) determination for the chiller.

BACKGROUND

Chillers transfer heat away from a space, thereby enabling the space to be cooled. Large buildings are typically not reliant on the cooling capabilities of a single chiller, but rather, may rely on a multitude of connected similar chillers (i.e., chillers of the same type, maximal capacity, and performance configured to work in parallel) contained in a chiller plant, which collectively act as a centralized cooling system that provides cooling for the building. Each chiller in the plant may contain one or more integrated sensors that may continuously measure various metrics of the chiller to ensure that it is operating efficiently. These metrics may be utilized to determine the COP of one or more chillers, which corresponds to the overall key performance metric (KPI) of the chiller and which measures a chiller's efficiency. However, sensors degrade over time and may begin outputting incorrect data, which may correspondingly affect the accuracy of the COP determination. Accordingly, given the foregoing, a need exists for a system and method that may determine which sensor data points to use in the COP determination when at least some of the sensor data is inaccurate.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for determining the data points to use in a COP calculation.

In one embodiment, a computer-implemented method for controlling equipment based on assessing efficiency of a chiller is provided. The computer-implemented method comprising operations including: performing, using a processor of a computer system, an energy balance check on operational data of a chiller in a chiller group; selecting, using the processor and based on the energy balance check, a reference chiller from one or more other chillers in the chiller group, wherein an energy flow of the reference chiller has a best energy balance amongst the one or more other chillers; determining the efficiency of the chiller by using the processor to perform a coefficient of performance (COP) determination using a machine learning model trained on energy flow of the selected reference chiller; and controlling equipment including or impacted by the chiller, based on the determined efficiency of the chiller.

In accordance with another embodiment, a computer system for controlling equipment based on assessing efficiency of a chiller is provided. The computer system includes: a computer server; one or more computer processors; and a non-transitory computer-readable storage medium storing instructions executable by the one or more computer processors, the instructions when executed by the one or more computer processors causing the one or more computer processors to perform operations including: performing, using a processor of a computer system, an energy balance check on operational data of a chiller in a chiller group; selecting, using the processor and based on the energy balance check, a reference chiller from one or more other chillers in the chiller group, wherein an energy flow of the reference chiller has a best energy balance amongst the one or more other chillers; determining the efficiency of the chiller by using the processor to perform a coefficient of performance (COP) determination using a machine learning model trained on energy flow of the selected reference chiller; and controlling equipment including or impacted by the chiller based on the determined efficiency of the chiller.

In accordance with another embodiment, a non-transitory computer-readable medium storing instructions executable by one or more computer processors of a computer server is provided. The instructions, when executed by the one or more computer processors, cause the one or more computer processors to perform operations including: performing an energy balance check on operational data of a chiller in a chiller group; selecting, based on the energy balance check, a reference chiller from one or more other chillers in the chiller group, wherein an energy flow of the reference chiller has a best energy balance amongst the one or more other chillers; determining the efficiency of the chiller by using the one or more computer processors to perform a coefficient of performance (COP) determination using a machine learning model trained on energy flow of the selected reference chiller; and controlling equipment including or impacted by the chiller, based on the determined efficiency of the chiller.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a flowchart of an exemplary method for identifying an efficiency of a chiller, according to one or more embodiments of the present disclosure.

FIG. 6 depicts a graph that illustrates energy balance data for a plurality of exemplary chiller in a chiller group, according to one or more embodiments of the present disclosure.

DETAILED DESCRIPTION OF EMBODIMENTS

Figure 1:
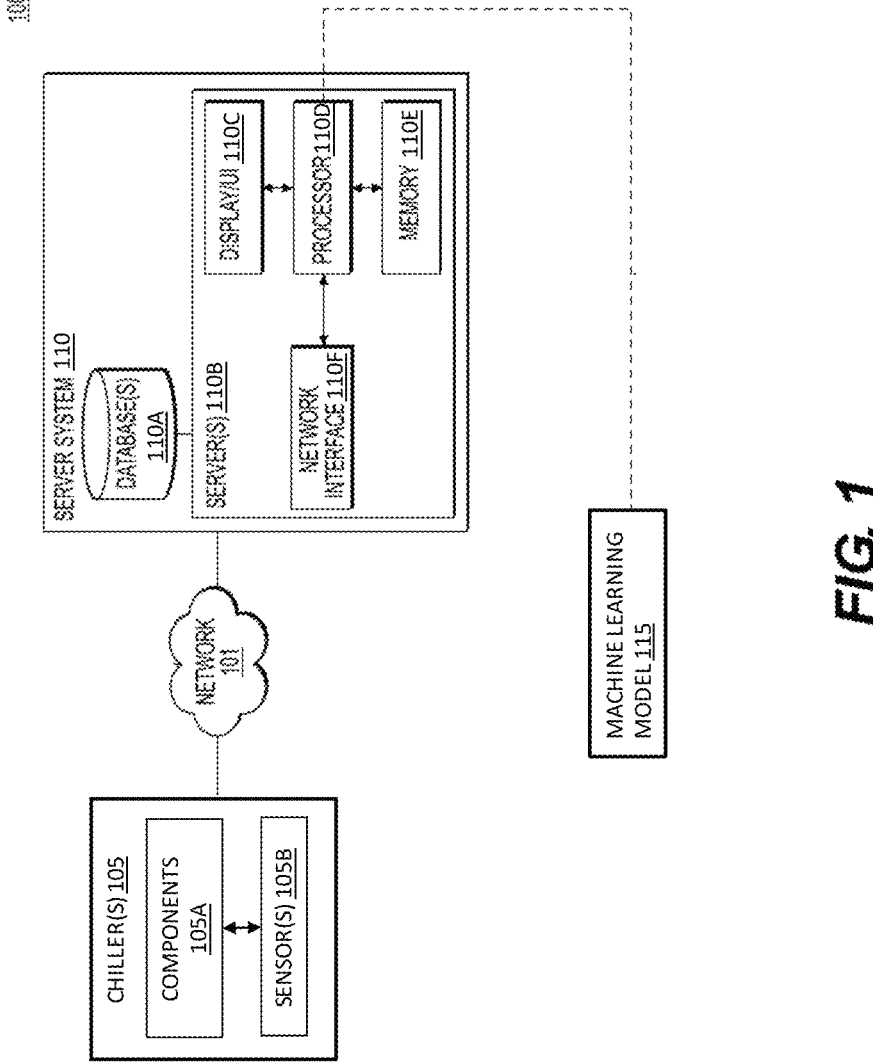
FIG. 1 depicts an exemplary system infrastructure, according to one or more embodiments of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, systems and methods for generating a context-based product serialization code to assign to saleable goods is described.

As previously alluded to above, the cooling of buildings is generally managed by a plurality of connected chillers contained in a chiller plant. Good maintenance of these chillers is essential to keeping a chiller plant in peak operational efficiency. To this extent, energy balance checks are frequently performed on each chiller to determine whether the energy flows are in balance. More particularly, the energy balance check aims to determine whether the heat flow in the evaporator, in addition to the energy flow into the compressor, match the heat flow in the condenser. The determinations obtained from these energy balance checks may be utilized to determine a coefficient of performance (COP) of the chiller, which is an indication of chiller performance and characterizes chiller efficiency as a ratio of consumption of electricity in kilowatts (kW) and cooling capacity in kW. The COP may provide an indication of most chiller issues that result in less efficient operation, including evaporator/condenser fouling, issues with the refrigerant or compressor, etc.

The data points utilized to conduct the energy balance check, and that correspondingly affect the COP determination, may be obtained from one or more sensors associated with each chiller. Over time, these sensors may degrade and may contribute to the production of inaccurate outputs that may not be indicative of true chiller performance. These inaccurate outputs may consequently skew the COP determination, or prevent the COP from even being determined at all, which may correspondingly lead to a variety of ramifications for the chiller plant. More particularly, a chiller plant computer system may rely on the COP of each chiller when performing different functions. If the COP for any chiller is inaccurate, then that may negatively affect the performance of the foregoing functions. For instance, the plant system may manage an optimal chiller schedule that covers the expected cooling demand of a space for an upcoming period of time. The system may add chillers to the schedule according to their COP parameter, wherein chillers having higher COPs are assigned a higher scheduling preference. If the COP is not correctly determined (e.g., due to faulty monitoring), a highly efficient chiller may be perceived as a low-efficiency chiller and may be set aside from the schedule in favor of a less efficient chiller, which may ultimately result in financial loss due to the less efficient chiller requiring greater energy consumption to perform the task.

Generally, energy imbalances in chillers are resultant from one or a few wrong data points. Accordingly, a COP for a chiller may still be determined even in situations where an energy imbalance is present. For instance, a possible COP may be determined either from condenser or from evaporator energy flows (i.e., the energy flow values calculated from the sensor data). However, no conventional technique currently exists for identifying which of the foregoing energy flows is correct and should be utilized for the COP determining when an energy imbalance is detected.

Accordingly, in view of the foregoing issues, the following embodiments describe systems and methods for determining an efficiency of a chiller when an energy imbalance is present in the chiller. According to certain aspects of the present disclosure, an energy balance check may first be performed on a chiller in a chiller group. Responsive to determining that the energy balance check reveals that the energy flow of the chiller is imbalanced, a plant system may select and utilize operational data from another chiller in the chiller group whose energy flow is optimally balanced (i.e., a "reference chiller") to train a machine-learning model to identify proper energy flow metrics for components in the chiller. The trained model may then be applied to the chiller containing the energy flow imbalance to determine which energy flow, either condenser or evaporator, may be utilized for the COP determination, which may correspondingly identify an efficiency of the chiller. Having confidence in its knowledge of the chiller efficiency, a plant system may thereafter perform one or more functions associated with the chiller. For example, the plant system may control equipment including, impacted by, or associated with the chiller based on its determined efficiency.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

FIG. 1 depicts an exemplary environment 100, representative of a chiller plant system, which may be utilized with the techniques presented herein. One or more chillers 105 may communicate across a network 101 with one or more server system(s) 110. As will be discussed in further detail below, the one or more server system(s) 110 may be configured to train and leverage a machine-learning model 115 to identify data points of the chiller to use in a COP determination. In some embodiments, the components of the environment 100 may be associated with a common entity, e.g., a single business or organization, or, alternatively, one or more of the components may be associated with a different entity than another. The systems and devices of the environment 100 may communicate in any arrangement.

Each of the chillers 105 may contain one or more components 105A. For instance, each chiller may contain four essential components: a condenser, a compressor, an evaporator, and an expansion unit (e.g., in the form of thermal expansion valves). Additionally to the foregoing, each chiller may also contain a refrigerant. The chiller condenser may operate to eliminate heat from the refrigerant being circulated through the chiller unit. This may be achieved by circulating water between a cooling tower and the condenser (e.g., for water-cooled variants) or blowing cool air over condenser piping (e.g., for air-cooled chiller units). The compressor may operate as the driving unit of the chiller by generating the pressure gradient necessary to push the refrigerant around the chiller unit to achieve process cooling. More particularly, the primary aim of the compressor may be to achieve and keep high pressure in condenser and low pressure in evaporator, which realizes the physical process of cooling. The evaporator is a heat exchanger that causes evaporation of refrigerant in liquid form to gaseous refrigerant. The thermal expansion valves serve to expand refrigerant passing through them, which diminishes the pressure and enables the heat elimination from the evaporator. Chillers 105 may correspond to a plurality of chillers, some or all of which may be organized into one or more chiller groups. Grouped chillers may be of the same type and may share common headers in parallel installation. More particularly, the grouped chillers may be chillers of the same type, maximal capacity, and performance that are all configured to work in parallel.

Figure 2:
FIG. 2 depicts an exemplary operational arrangement of grouped chillers in a chiller plant, according to one or more embodiments of the present disclosure.

Turning now to FIG. 2, an exemplary operational flow of grouped chillers in a chiller plant is provided. More particularly, FIG. 2 depicts a conventional configuration of a cooling system with a plurality of chillers in a chiller plant. The chillers in the plant cool chilled water (CHW), which is driven by CHW pumps, and thereafter return the CHW to the pipes of a building's cooling system, which correspondingly facilitate the cooling of the building. The heat retrieved from the CHW is transferred, by the chillers, to cooling water supplied by the CW pumps. After passing through the cooling equipment, where it receives heat in the condensers, this water is subsequently delivered to the cooling towers, which thereafter dissipate the heat to the air.

Referring back to FIG. 1, one or more sensors 105B may be integrated into the chillers 105 and may be configured to monitor the operation of one or more of the chiller components 105A. More particularly, some or all of the components 105A may generate one or more data points that may be tracked by the sensors 105B. For instance, the heat transfer rates of the condenser, evaporator, and compressor may be tracked by the sensors 105B throughout the course of chiller operation. The sensors 105B may track these data points substantially continuously or, alternatively, may track them at predetermined intervals.

Data obtained by the one or more sensors 105B may be transmitted to one or more server systems 110 using a network protocol via the network 101. Non-limiting exemplary network protocols include MQ Telemetry Transport, Hypertext Transfer Protocol, and Constrained Application Protocol. Transmission methods may vary, however, based on loss-tolerance, security, and timeliness requirements of the data. The network 101 may be configured to be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks—a network of networks in which a party at one computer or other device connected to the network can obtain information from any other computer and communicate with parties of other computers or devices.

The server system 110 may include an electronic data system, computer-readable memory such as a hard drive, flash drive, disk, etc. In some embodiments, the server system 110 includes and/or interacts with an application programming interface for exchanging data to other systems, e.g., one or more of the other components of the environment. The server system 110 may include and/or act as a repository or source for extracted raw dataset information.

The server system 110 may include a database 110A and at least one server 110B. The server system 110 may be a computer, system of computers (e.g., rack server(s)), and/or or a cloud service computer system. The server system may store or have access to database 110A (e.g., hosted on a third party server or in memory 115E). The server(s) may include a display/UI 110C, a processor 110D, a memory 110E, and/or a network interface 110F. The display/UI 110C may be a touch screen or a display with other input systems (e.g., mouse, keyboard, etc.) for an operator of the server 110B to control the functions of the server 110B. The server system 110 may execute, by the processor 110D, an operating system (O/S) and at least one instance of a servlet program (each stored in memory 110E). When sensors 105B of the chillers 105 transmit data to the server system, the received dataset and/or dataset information may be stored in memory 110E or database 110A. The network interface 110F may be a TCP/IP network interface for, e.g., Ethernet or wireless communications with the network 101.

The processor 110D may include and/or execute instructions to train and/or implement a machine learning model 115. As used herein, a "machine-learning model" generally encompasses instructions, data, and/or a model configured to receive input, and apply one or more of a weight, bias, classification, or analysis on the input to generate an output. The output may include, for example, an analysis based on the input, a prediction, suggestion, or recommendation associated with the input, a dynamic action performed by a system, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of a machine-learning model may include deployment of one or more machine-learning techniques, such as k-nearest neighbors, linear regression, logistical regression, random forest, gradient boosted machine (GBM), support-vector machine, deep learning, a deep neural network, and/or any other suitable machine-learning technique that solves problems in the field of Natural Language Processing (NLP). Supervised, semi-supervised, and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Prior to introduction to a machine learning infrastructure, data may be processed and normalized (e.g., via one or more processors such as processor 110B). As used herein, the term "normalize" may refer to the transformation of a value or a set of values to a common frame of reference for comparison purposes. In this regard, one or more normalization algorithms or techniques (e.g., min-max normalization, z-score normalization, decimal scaling, logarithmic transformation, root transformation, etc.) may be leveraged to bring all data attributes in the context data onto the same scale. Such a process may correspondingly improve the performance of the machine learning model by reducing the impact of any outliers and by improving the accuracy of a trained machine learning model associated therewith.

In some embodiments, a machine-learning model based on neural networks includes a set of variables, e.g., nodes, neurons, filters, etc., that are tuned, e.g., weighted or biased, to different values via the application of training data. In other embodiments, a machine learning model may be based on architectures such as support-vector machines, decision trees, random forests or Gradient Boosting Machines (GBMs). Alternate embodiments include using techniques such as transfer learning, wherein one or more pre-trained machine learning models on large common or domain specific dataset may be leveraged for analyzing the training data.

In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn semantic associations between the raw data and the context with which it is associated with (e.g., aspects of the industrial or professional field that the raw data is associated with, etc.), such that the trained machine-learning model is configured to provide output features that are contextually relevant for a user's purpose.

In various embodiments, the variables of a machine-learning model may be interrelated in any suitable arrangement in order to generate the output. For example, in some embodiments, the machine-learning model may include signal processing architecture that is configured to identify, isolate, and/or extract features, patterns, and/or structure in a text. For example, the machine-learning model may include one or more convolutional neural network ("CNN") configured to identify characteristics of the chiller operational data, and may include further architecture, e.g., a connected layer, neural network, etc., configured to determine a relationship between the operational metrics in order to identify an expected operational state of other chillers in a chiller group based on current conditions.

As discussed in further detail below, the server system 110 may generate, store, train, or use one or more machine-learning models 115 configured to estimate which of the two heat flows, associated with the evaporator or the condenser, in a chiller is correctly determined and which causes the disbalance in the chiller. The balanced heat flow metric (i.e., the heat flow estimated to be correct) may thereafter be utilized to determine the efficiency of the chiller via performance of a COP determination. The server system 110 may include one or more machine-learning models 115 and/or instructions associated with each of the one or more machine-learning models 115, e.g., instructions for generating a machine-learning model, training the machine-learning model, using the machine-learning model, etc. The server system 110 may include instructions for retrieving output features, e.g., based on the output of the machine-learning model, and/or operating the display 110C to generate one or more output features, e.g., as adjusted based on the machine-learning model. In some embodiments, a system or device other than the server system 110 may be used to generate and/or train the machine-learning model 115. For example, such a system may include instructions for generating the machine-learning model 115, the training data and ground truth, and/or instructions for training the machine-learning model 115. A resulting trained machine-learning model may then be provided to the server system 110.

Figure 3:
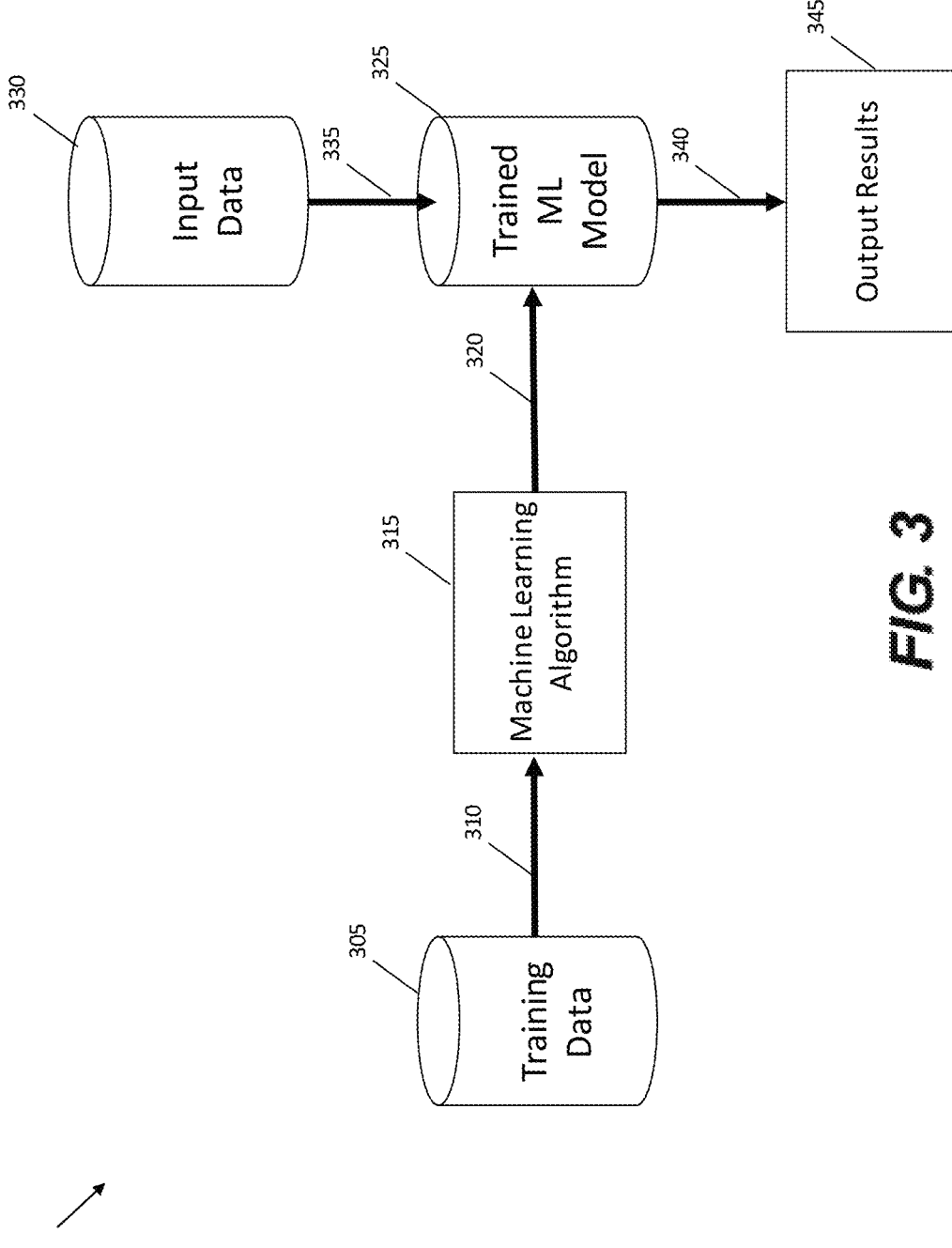
FIG. 3 depicts a flow diagram for training and deploying an exemplary machine learning model, according to one or more embodiments of the present disclosure.

FIG. 3 depicts a flow diagram 300 of an exemplary process for training and deploying the machine learning model 115 via a supervised learning process. In an embodiment, training data 305 for the machine learning model may first be obtained. The training data 305 may correspond to operational data obtained from at least one chiller in a chiller group determined to contain the best energy balance data. In this regard, the "best" chiller may be the one for which the measured energy flow into the evaporator, combined with the measured energy flow into the compressor, most closely matches the energy flow out of the condenser. The selected chiller may be referred to as a reference chiller and the training data 305 relied on to train the machine learning model 115 may be the reference chiller data. The reference chiller data may be labeled with information so that the machine learning model can identify the component that is outputting each data point.

The training data 305 may thereafter be applied, at step 310, to a machine learning algorithm 315 to train an untrained machine learning model to recognize the expected output values of the chiller components for a chiller group operating under a predetermined condition. For instance, an untrained machine learning model may be trained to identify expected values for the heat flow into the evaporator, and heat flow in the condenser when the energy flow of the chiller is balanced. This training phase may ultimately generate, at step 320, a trained machine learning model that may thereafter receive, at step 335, input data 330. Here, the input data 330 may correspond to measured operational data for any chiller similar to the reference chiller in the examined plant for which an energy imbalance was determined to be present.

The trained machine learning model 325 may process the input data 330 to generate, at step 340, an output result 345. More particularly, the trained machine learning model 325, having knowledge of the reference chiller data that corresponds to a chiller that has an energy flow balance, may identify which set of heat flow data for the "input" chiller deviate from the expected heat flow data found in the reference chiller data (e.g., which of the condenser or evaporator heat flows deviate significantly from their expected values, i.e., by a predetermined threshold amount). In an embodiment, the output result 345 may be an identification of the component whose data points most closely resemble the corresponding component data in the reference chiller data, thereby indicating that the sensors associated with the identified component are operational and that the data measured by them can be utilized to determine the COP of the chiller.

Referring back to FIG. 1, although depicted as separate components in FIG. 1, it should be understood that a component or portion of a component in the environment 100 may, in some embodiments, be integrated with or incorporated into one or more other components. In some embodiments, operations or aspects of one or more of the components discussed above may be distributed amongst one or more other components. Any suitable arrangement and/or integration of the various systems and devices of the environment 100 may be used.

In the following methods, various acts may be described as performed or executed by a component from FIG. 1, such as the server system 110, the chillers 105, or components thereof. However, it should be understood that in various embodiments, various components of the environment 100 discussed above may execute instructions or perform acts including the acts discussed below. An act performed by a device may be considered to be performed by a processor, sensor, actuator, or the like associated with that device. Further, it should be understood that in various embodiments, various steps may be added, omitted, and/or rearranged in any suitable manner.

FIG. 4 depicts an exemplary process flow 400 for assessing an efficiency of a chiller and performing a corresponding action. The exemplary process flow 400 may be implemented by system environment 100, which includes chiller(s) 105, a server system 110, and a machine learning model 115.

At step 405, the server system 110 of the of the system environment 100 may perform an energy balance check on operational data of a chiller in a chiller group. The operational data may be energy flow data associated with a variety of chiller components 105A, including the evaporator, compressor, and condenser. The operational data may be tracked by one or more sensors 105B positioned on, or integrated within, the chiller 105. The tracked data may thereafter be transmitted by the one or more sensors 105B to the server system 110 via the network 101. In an embodiment, the energy balance check may be performed, for instance, by identifying whether a first energy flow metric associated with the evaporator combined with a second energy flow metric associated with the compressor matches a third energy flow metric associated with the condenser.

At step 410, the server system 110 may determine whether an energy flow of the chiller is balanced or imbalanced based on the energy balance check performed at step 405. In this regard, the energy flow of the chiller 105 may be determined to be balanced responsive to identifying that the first energy flow metric of the evaporator combined with the second energy flow metric of the compressor matches the third energy flow metric of the condenser. Conversely, the energy flow of the chiller 105 may be determined to be imbalanced responsive to identifying that the first energy flow metric of the evaporator combined with the second energy flow metric of the compressor does not match the first energy flow metric of the condenser.

Figure 5:
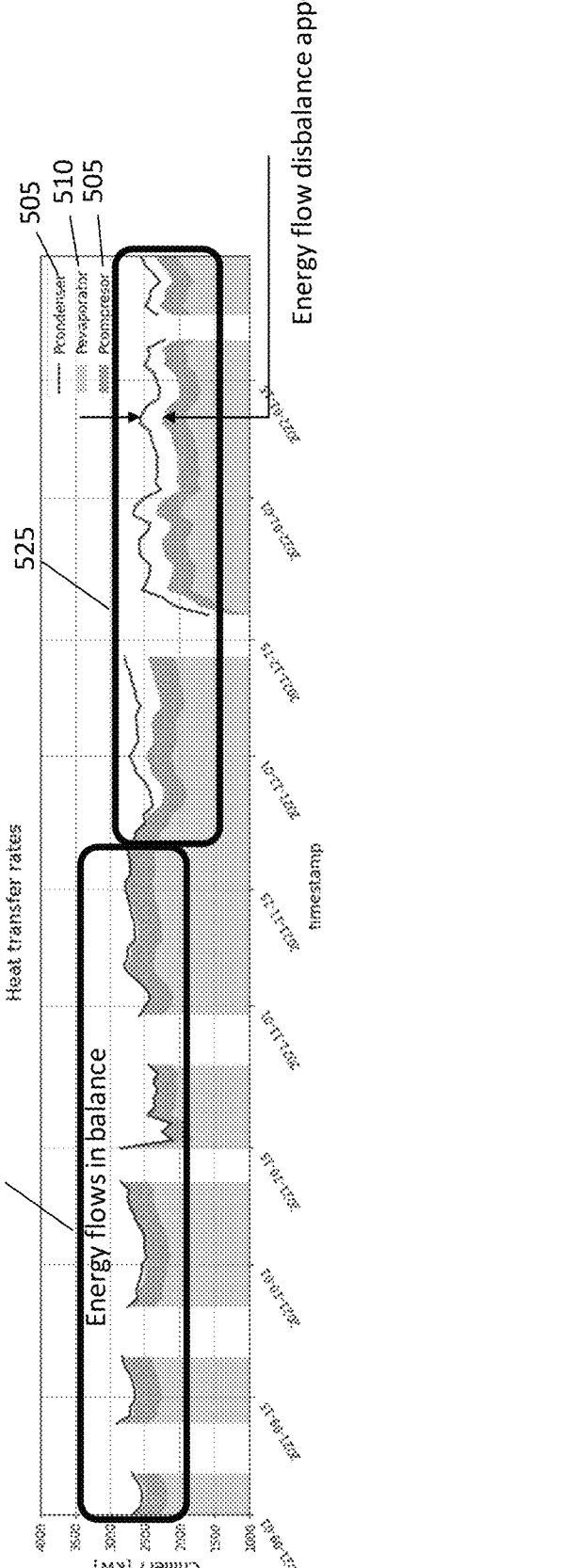
FIG. 5 depicts a graph that illustrates balanced and imbalanced energy flow data for an exemplary chiller, according to one or more embodiments of the present disclosure.

Turning now to FIG. 5, a graph 500 is provided that illustrates exemplary balanced and imbalanced energy flow data for a chiller. The graph 500 may plot three metrics, including the energy flow into the condenser 505 (represented with a solid line), the energy flow in the evaporator 510 (represented with a dotted filling), and the energy flow in the compressor 515 (represented as a shaded filling). When the energy flow is in balance, as indicated in the area bounded by box 520, the combined value of the energy flow in the evaporator 510 and the energy flow in the compressor 515 closely matches the energy flow into the condenser 505. Conversely, when the energy flow is imbalanced, as indicated in the area bounded by box 525, the combined value of the energy flow in the evaporator 510 and the energy flow in the compressor 515 is not aligned with the energy flow into the condenser 505. Accordingly, for a chiller outputting energy flow data resembling the trends illustrated in box 525, the COP cannot be confidently determined because it is not known which of the metrics are at issue (e.g., it is not known whether the data representing the energy flow into the condenser 505 is incorrect or whether the data representing the combined value of the energy flow in the evaporator 510 and the energy flow in the compressor 515 is incorrect).

Responsive to determining, at step 410, that the energy flow of the chiller 105 is balanced, the server system 110 may determine, at step 415, the efficiency of the chiller (i.e., via a COP determination) using conventional techniques (e.g., the COP may be determined from the third energy flow metric of the condenser or the second energy flow metric of the evaporator). Conversely, responsive to determining, at step 410, that the energy flow of the chiller 105 is imbalanced, the server system 110 may, at step 420, identify one or more other chillers in the chiller group having balanced energy flows. The energy flows of the other chillers may be identified by performing similar energy balance checks as was performed in step 405. Those chillers for which the first energy flow metric of the evaporator combined with the second energy flow metric of the compressor substantially matches the third energy flow metric of the condenser may be considered balanced.

At step 425, the server system 110 may select a reference chiller from the other chillers in the chiller group determined to have balanced energy flows ("balanced chillers"). In an embodiment, the reference chiller may be the balanced chiller that exhibits the best energy balance in the chiller group. Stated differently, the reference chiller may be the balanced chiller for which the first energy flow metric of the evaporator combined with the second energy flow metric of the compressor most closely matches the third energy flow metric. For example, referring to FIG. 6, a graph 600 is provided that illustrates exemplary energy balance data for four chillers 605-620 in a chiller group. The energy balance data presented in the graph 600 may correspond to data filtered above 80% of compressor full power. The selection of the reference chiller may involve identifying the chiller whose corresponding data falls within an upper and lower limit of a predefined range 625 (e.g., the range of allowed imbalance is 50% of full compressor power). Given these parameters, it can be seen that chiller 615 may be chosen as the reference chiller because it has the lowest imbalance and is operating within the predefined range.

At step 430, the operational data from the selected reference chiller may be utilized as training input to train a machine learning model. In this regard, the machine learning model may be trained to identify expected energy flow metrics for components in a balanced chiller that is operating under a specific conditional state. More particularly, each chiller in a chiller group may operate under the same or different conditions. These conditions may be affected by a variety of variables such as the weather, building occupancy, etc. Accordingly, a balanced energy flow of a chiller operating under a first condition may be different than the balanced energy flow of the same chiller operating under a second condition. The reference operational data of the reference chiller may be representative of what a balanced energy flow should be for each chiller in the chiller group under a current condition. Therefore, training the machine learning model on the reference operational data may enable it to identify which energy flow metrics of the chiller are aligned with the reference operational data and which are not (e.g., is the energy flow associated with the condenser or evaporator aligned with the reference operational data). Additional details regarding the training of the machine learning model are previously described above with respect to FIG. 3.

At step 435, the operational data of the chiller 105 may be applied to the machine learning model that is trained off of the reference operational data of the reference chiller (i.e., the "trained machine learning model"). The trained machine learning model may process the operational data of the chiller 105 and generate an output result that may be received by the server system 110 at step 440. In an embodiment, the output result may identify a balanced energy flow metric from the operational data of the chiller 105. More particularly, the balanced energy flow metric may correspond to the energy flow data of the chiller component 105A that resembles the reference energy flow data in the reference operational data of the corresponding chiller component (e.g., within a predetermined range of similarity, etc.). For example, the energy flow of the evaporator in the chiller 105 may be determined to be balanced because it resembles a data pattern of the energy flow of the reference evaporator in the reference chiller. Correspondingly, in the same example, the energy flow of the compressor in the chiller 105 may be determined to be imbalanced or inaccurate because it does not resemble a data pattern of the energy flow of the reference compressor in the reference chiller. Stated differently, the energy flow determined to be imbalanced may be the one that deviates from the data pattern of the energy flow of the corresponding component in the reference chiller by a predetermined threshold amount.

Figure 7:
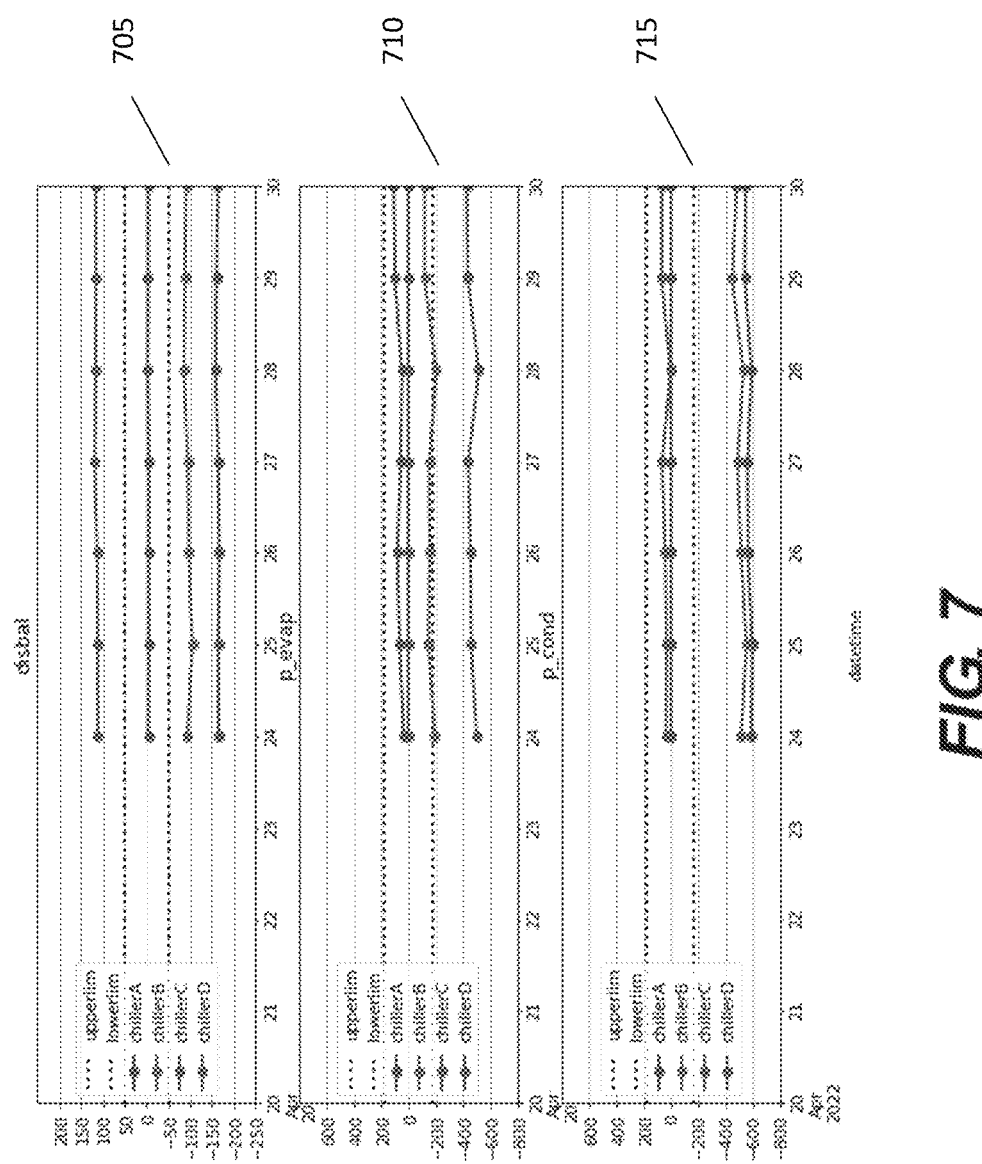
FIG. 7 depicts a graph set of energy flow metrics calculated for multiple chillers, according to one or more embodiments of the present disclosure.

Turning now to FIG. 7, a graph set 700 of energy flow metrics determined for multiple chillers are provided. Graph 705 is similar to the graph 600 presented in FIG. 6 and establishes chiller C as the reference chiller (i.e., because the metrics for Chiller C indicate the best energy balanced chiller of the chiller group). Accordingly, expected energy flows in the evaporator and condenser of chillers A, B, and D are evaluated using the model of chiller C. Examination of the energy flows in the evaporator data, as presented in graph 710, indicate that the evaporator data for chillers A and B may be balanced because they resemble the data pattern for the evaporator energy flow of chiller C and fall within the accepted range of deviance. Accordingly, the COP for chillers A and B may be determined from the evaporator energy flow metrics. However, the COP for chiller D cannot be determined the conventional way, i.e., because it substantially differs from the standard evaporator energy flow pattern established by chiller C, so it must be determined using the inventive techniques described herein. Examination of the energy flows in the condenser data, as presented in graph 715, indicate that the condenser data for chiller D may be balanced because it resembles the data pattern for the condenser energy flow of chiller C and falls within the accepted range of deviance. Accordingly, the COP for chiller D may be determined from the condenser energy flow metrics. However, the COP for chillers A and B cannot be determined from the condenser energy flow metrics because they substantially differ from the standard condenser energy flow pattern established by chiller C.

Figure 8:
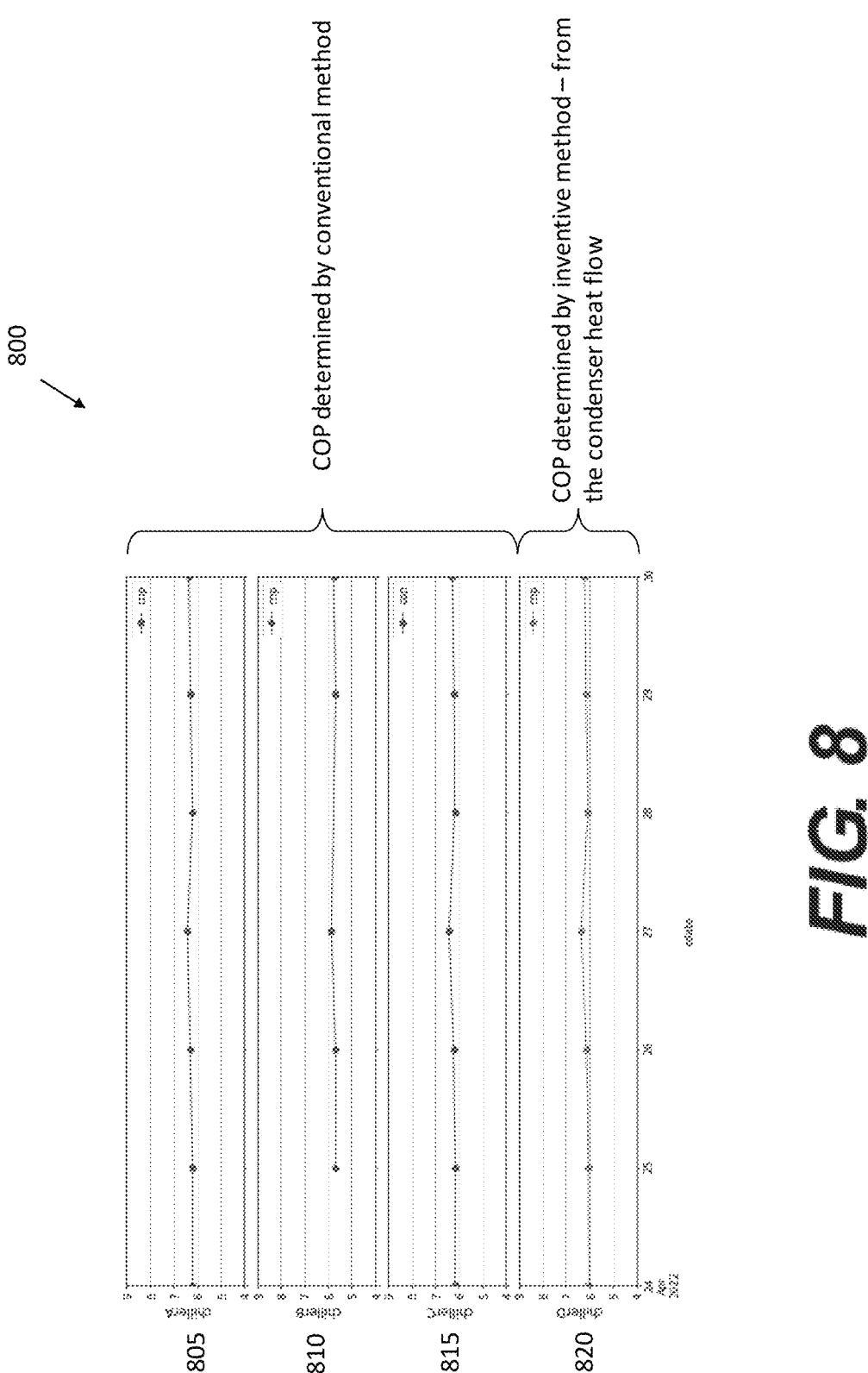
FIG. 8 depicts a graph set of exemplary COP metrics for a plurality of chillers in a chiller group, according to one or more embodiments of the present disclosure.

At step 445, the server system 110 may determine an efficiency of the chiller based on the energy flow metric provided by the trained machine learning model. In this regard, the server system 110 may determine the COP for the chiller 105 by utilizing the energy flow metric in the operational data of the chiller that is determined by the trained machine learning model to be balanced. In an embodiment, the determined COP may fall within an expected level of deviation from an expected COP. Turning now to FIG. 8, a graph set 800 is provided of the COP determined for a plurality of exemplary chillers 805-820. For chillers 805-815, the efficiency of the chiller may have been determined using a conventional COP determination technique (i.e., because the energy flows of these chillers were determined to be balanced). Conversely, the efficiency of chiller 820 may have been determined using the inventive COP determination technique, as detailed in FIG. 4, because the energy flow for chiller 820 may have been imbalanced. As can be seen, the COP determination using the inventive technique produces substantially similar results to the COP determination using the conventional technique.

In an embodiment, the server system 110 may utilize the knowledge of the chiller efficiency (i.e., the determined COP) from step 445 to perform an action associated with the chiller. In an embodiment, the action may correspond to the controlling of equipment including, impacted by, or associated with the chiller, based on the determined efficiency of the chiller. For instance, the server system 110 may dynamically generate and transmit a notification to a user (e.g., an operator or supervisor of the plant system, etc.) that identifies a chiller component for which the energy flow metric was determined to be imbalanced. More particularly, the server system 110 may identify which of the chiller components were not relied on to determine the COP and may provide an indication to the user of this component. This may prompt the user to perform a maintenance check to identify the issue with the chiller (e.g., sensor malfunctioning, component broken or unclean, etc.). In another embodiment, the determination of COP described above typically utilizes data associated with a short period of time (e.g., one or several days, etc.) when no changes of chiller parameters (due to degradation) are detectable. Correspondingly, each COP determination represents the instant state of the chiller. Repeating this process over a longer period of time may provide a plurality of data points, an analysis of which may reveal indications of chiller performance degradation and may influence decision-making regarding chiller maintenance. In yet another embodiment, the server system 110 may manage the position of the chiller 105 in a chiller schedule based on its determined efficiency. More particularly, a chiller cooling schedule may be one that covers the expected cooling demand for an area for an upcoming period of time. Chillers may be included into the schedule according to their efficiency (i.e., the determined COP parameter), wherein the higher the COP the higher the preference assigned to them. The server system 110 may accordingly leverage the determined COP at step 445 to position the chiller 105 in the schedule based on its efficiency.

In an embodiment, another method of performing an efficiency determination for a chiller is contemplated herein. This alternative method may employ the same steps, 405-435, as illustrated in FIG. 4 and as previously described above. However, two COP determinations are calculated using the condenser energy flow metrics and the evaporator energy flow metrics for a chiller in a chiller group for which the energy flow metrics were determined to be imbalanced. The flow metric for the component that deviates the least from the expected COP value, as based on the reference chiller model, may be the one chosen to utilize in a COP determination for the chiller.

In general, any process discussed in this disclosure that is understood to be computer-implementable, such as the process illustrated in FIG. 4, may be performed by one or more processors of a computer system, such as system environment 100, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as system environment 100, may include one or more computing devices. If the one or more processors of the computer system are implemented as a plurality of processors, the plurality of processors may be included in a single computing device or distributed among a plurality of computing devices. If a system environment comprises a plurality of computing devices, the memory of the computer system may include the respective memory of each computing device of the plurality of computing devices.

Figure 9:
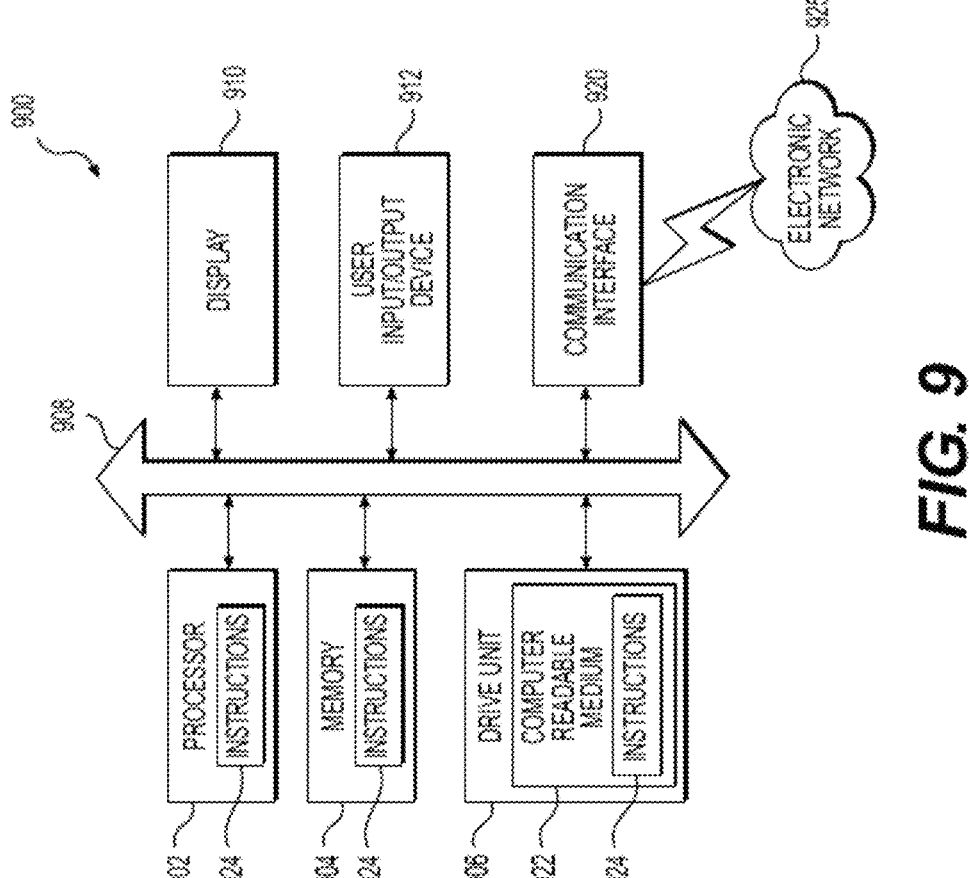
FIG. 9 depicts an exemplary computing server, according to one or more embodiments of the present disclosure.

FIG. 9 is a simplified functional block diagram of a computer system 900 that may be configured as a computing device for executing the process illustrated in FIG. 4, according to exemplary embodiments of the present disclosure. FIG. 9 is a simplified functional block diagram of a computer that may be configured as according to exemplary embodiments of the present disclosure. In various embodiments, any of the systems herein may be an assembly of hardware including, for example, a data communication interface 920 for packet data communication. The platform also may include a central processing unit ("CPU") 902, in the form of one or more processors, for executing program instructions. The platform may include an internal communication bus 908, and a storage unit 906 (such as ROM, HDD, SDD, etc.) that may store data on a computer readable medium 922, although the system 900 may receive programming and data via network communications. The system 900 may also have a memory 904 (such as RAM) storing instructions 924 for executing techniques presented herein, although the instructions 924 may be stored temporarily or permanently within other modules of system 900 (e.g., processor 902 and/or computer readable medium 922). The system 900 also may include input and output ports 912 and/or a display 910 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for controlling equipment based on assessing efficiency of a chiller, the computer-implemented method comprising operations including:

performing, using a processor of a computer system, an energy balance check on operational data of a chiller and an energy balance check on operational data of each chiller out of one or more other chillers in a chiller group;

selecting, using the processor and based on the energy balance checks, a reference chiller from the one or more other chillers in the chiller group, wherein an energy flow of the reference chiller has a best energy balance amongst the one or more other chillers;

determining the efficiency of the chiller by using the processor to perform a coefficient of performance (COP) determination using a machine learning model trained on energy flow of the selected reference chiller; and controlling equipment including or impacted by the chiller, based on the determined efficiency of the chiller.

2. The method of claim 1, wherein the operational data is received from one or more sensors associated with a plurality of components of the chiller and wherein the plurality of components include: an evaporator, a compressor, and a condenser.

3. The method of claim 2, wherein the performing the energy balance check comprises identifying whether a first energy flow metric associated with the evaporator combined with a second energy flow metric associated with the compressor matches a third energy flow metric associated with the condenser.

4. The method of claim 3, wherein the selecting the reference chiller comprises:

determining, based on the energy balance check, whether an energy flow of the chiller is balanced or imbalanced;

identifying, using the processor and responsive to determining that the energy flow of the chiller is imbalanced, the one or more other chillers in the chiller group for which the energy flow is balanced.

5. The method of claim 4, wherein the determining whether the energy flow of the chiller is balanced or imbalanced comprises:

determining that the energy flow is balanced responsive to identifying that the first energy flow metric combined with the second energy flow metric matches the third energy flow metric; and determining that the energy flow is imbalanced responsive to identifying that the first energy flow metric combined with the second energy flow metric does not match the third energy flow metric.

6. The method of claim 1, wherein using the machine learning model trained on energy flow of the selected reference chiller comprises:

training, using the reference operational data from the reference chiller, a machine learning model to identify energy flow metrics when the energy flow is balanced;

receiving, upon applying the operational data of the chiller to the trained machine learning model, an output result from the trained machine learning model that identifies a balanced energy flow metric from the operational data; and performing, using the processor, a coefficient of performance (COP) determination for the chiller utilizing the balanced energy flow metric.

7. The method of claim 6, wherein the chiller group is operating under a conditional state and wherein the training the machine learning model comprises training the machine learning model to identify the energy flow metrics when the energy flow is balanced under the conditional state.

8. The method of claim 6, wherein the COP determination for the chiller utilizing the balanced energy flow metric deviates from another COP determination for the reference chiller by an expected amount.

9. The method of claim 1, wherein the controlling the equipment comprises managing a position of the chiller in a chiller schedule based on the determined efficiency.

10. The method of claim 1, wherein the controlling the equipment comprises transmitting a notification to a user that identifies a chiller component responsible for an imbalanced flow metric in the operational data.

11. A computer system for controlling equipment based on assessing efficiency of a chiller, the computer system comprising:

a computer server;

one or more computer processors; and a non-transitory computer-readable storage medium storing instructions executable by the one or more computer processors, the instructions when executed by the one or more computer processors causing the one or more computer processors to perform operations including:

performing, using a processor of a computer system, an energy balance check on operational data of a chiller and an energy balance check on operational data of each chiller out of one or more other chillers in a chiller group;

selecting, using the processor and based on the energy balance checks, a reference chiller from the one or more other chillers in the chiller group, wherein an energy flow of the reference chiller has a best energy balance amongst the one or more other chillers;

determining the efficiency of the chiller by using the processor to perform a coefficient of performance (COP) determination using a machine learning model trained on energy flow of the selected reference chiller; and controlling equipment including or impacted by the chiller based on the determined efficiency of the chiller.

12. The computer system of claim 11, wherein the operational data is received from one or more sensors associated with a plurality of components of the chiller and wherein the plurality of components include: an evaporator, a compressor, and a condenser.

13. The computer system of claim 12, wherein the performing the energy balance check comprises identifying whether a first energy flow metric associated with the evaporator combined with a second energy flow metric associated with the compressor matches a third energy flow metric associated with the condenser.

14. The computer system of claim 13, wherein the selecting the reference chiller comprises:

determining, based on the energy balance check, whether an energy flow of the chiller is balanced or imbalanced;

identifying, using the processor and responsive to determining that the energy flow of the chiller is imbalanced, the one or more other chillers in the chiller group for which the energy flow is balanced.

15. The computer system of claim 14, wherein the determining whether the energy flow of the chiller is balanced or imbalanced comprises:

determining that the energy flow is balanced responsive to identifying that the first energy flow metric combined with the second energy flow metric matches the third energy flow metric; and determining that the energy flow is imbalanced responsive to identifying that the first energy flow metric combined with the second energy flow metric does not match the third energy flow metric.

16. The computer system of claim 11, wherein using the machine learning model trained on energy flow of the selected reference chiller comprises:

training, using the reference operational data from the reference chiller, a machine learning model to identify energy flow metrics when the energy flow is balanced;

receiving, upon applying the operational data of the chiller to the trained machine learning model, an output result from the trained machine learning model that identifies a balanced energy flow metric from the operational data; and performing, using the processor, a coefficient of performance (COP) determination for the chiller utilizing the balanced energy flow metric.

17. The computer system of claim 11, wherein the chiller group is operating under a conditional state and wherein the training the machine learning model comprises training the machine learning model to identify the energy flow metrics when the energy flow is balanced under the conditional state.

18. The computer system of claim 11, wherein the controlling the equipment comprises managing a position of the chiller in a chiller schedule based on the determined efficiency.

19. The computer system of claim 11, wherein the controlling the equipment comprises transmitting a notification to a user that identifies a chiller component responsible for an imbalanced flow metric in the operational data.

20. A non-transitory computer-readable medium storing instructions executable by one or more computer processors of a computer server, the instructions when executed by the one or more computer processors cause the one or more computer processors to perform operations comprising:

performing an energy balance check on operational data of a chiller and an energy balance check on operational data of each chiller out of one or more other chillers in a chiller group;

selecting, based on the energy balance checks, a reference chiller from the one or more other chillers in the chiller group, wherein an energy flow of the reference chiller has a best energy balance amongst the one or more other chillers;

determining the efficiency of the chiller by using the one or more computer processors to perform a coefficient of performance (COP) determination using a machine learning model trained on energy flow of the selected reference chiller; and controlling equipment including or impacted by the chiller, based on the determined efficiency of the chiller.

\* \* \* \* \*